United States Patent

Kanoh et al.

Patent Number: 5,484,162
Date of Patent: Jan. 16, 1996

[54] VEHICLE HEIGHT CONTROL SYSTEM

[75] Inventors: Yoshiaki Kanoh, Nagoya; Yoshikazu Tachiiri, Chiryu; Kazuo Ogawa, Toyota, all of Japan

[73] Assignee: Aisin Seiki Kabushiki Kaisha, Japan

[21] Appl. No.: 189,556

[22] Filed: Feb. 1, 1994

[30] Foreign Application Priority Data

Feb. 5, 1993 [JP] Japan .................. 5-018654

[51] Int. Cl.$^6$ .................................. B60G 17/00
[52] U.S. Cl. .............................. 280/711; 417/278
[58] Field of Search .......................... 280/711, 714, 280/713, 707; 417/278, 290

[56] References Cited

U.S. PATENT DOCUMENTS

| | | | |
|---|---|---|---|
| 4,327,936 | 5/1982 | Sekiguchi | 280/711 |
| 4,465,297 | 8/1984 | Yamahara | 280/711 |
| 4,624,476 | 11/1986 | Tanaka et al. | 280/711 X |
| 4,911,617 | 3/1990 | Buma et al. | 280/711 X |

FOREIGN PATENT DOCUMENTS

| | | | |
|---|---|---|---|
| 0189880 | 8/1986 | European Pat. Off. | 280/711 |
| 0149815 | 9/1983 | Japan | 280/711 |
| 59-130718 | 7/1984 | Japan . | |

*Primary Examiner*—Mark T. Le
*Assistant Examiner*—Peter M. Poon
*Attorney, Agent, or Firm*—Finnegan, Henderson, Farabow, Garrett & Dunner

[57] ABSTRACT

A vehicle height control system including a shock absorber having an air chamber, an air compressor connected with the shock absorber through an air supply conduit, an air drain conduit connected the air supply conduit, an air drain valve in the air drain conduit and which is opened so as to discharge to the atmosphere, air stored in the air chamber and the air supply conduit, a cut-off valve disposed between the shock absorber and the air compressor in the supply conduit and which is closed so as to store the air in the air chamber, and a controller which controls an operation of the air compressor, the air drain valve and the cut-off valve so as to control the amount of air stored in the air chamber, wherein the air drain valve remains opened for a predetermined time during which operation of the air compressor is started and the cut-off vale is opened after the air compressor is started.

6 Claims, 2 Drawing Sheets

VEHICLE HEIGHT CONTROL SYSTEM

BACKGROUND OF THE INVENTION

1. Field of the Invention

This invention relates to a vehicle height control system in which a quantity of air stored in an air chamber associated with an air damper is increased and reduced to adjust the air damper and correspondingly the height of the vehicle.

2. Description of the Related Art

A conventional vehicle height control system is disclosed in the Japanese Patent Laid Open No. 59(1984)-130718. The disclosed vehicle height control system comprises an air damper with an associated expansible air chamber and an air compressor for compressing and pumping the air into the air chamber through a conduit. The vehicle height control system further comprises an air drain valve for discharging to the atmosphere, the air stored in the air chamber, and a cut-off valve for closing the conduit between the air damper and the air compressor.

When operation of the system is initiated to increase the height of the vehicle, the air drain valve is first opened for a predetermined time, during which the compressor remains inoperative and the cut-off valve remains closed, to vent the discharge conduit between the air compressor and the cut-off valve. At the moment operation of the air compressor is started, the air drain valve is closed and the cut-off valve is opened. As a result of reduced air pressure in the discharge conduit, starting operation of the air compressor is facilitated to enable use of a compact electric motor having a small starting torque. Further, when system operation to increase the height of the vehicle is stopped, operation of the air compressor is conventionally stopped at the moment the air drain valve is closed, although this latter operating procedure is not disclosed in the aforementioned Japanese Laid-Open Application.

However, air pressure in the conduit connecting the air damper and the air compressor is suddenly increased when operation of the air compressor is started even though the air pressure generated at that time is extremely low. Therefore, a large amount of vibration is suddenly generated in the vehicle height control system. Further, because the air pressure generated in the conduit connecting the air damper and the air compressor is rather high when operation of the air compressor is stopped, a large amount of vibration is generated at this time of system operation. Therefore, an uncomfortable noise occurs at the vehicle body as a result of the vibrations mentioned being transmitted to the vehicle body.

A rubber antivibration damper disposed between the air compressor and the vehicle body may be set to have a large elastic rate so as to prevent the vibration from being transmitted to the vehicle body. However, a large elastic rate of the rubber antivibration damper causes the vibration generated by the ordinary operation of the air compressor to bring the noise to the vehicle body. When the size of the rubber antivibration damper is increased to prevent the vibration generated when the air compressor is started, stopped and ordinarily operated, from transmission to the vehicle body, the rubber antivibration damper becomes difficult to mount on the vehicle within the small space available.

SUMMARY OF THE PRESENT INVENTION

It is an object of the present invention to provide an improved vehicle height control system by which vibration generated by the air compressor can be reduced.

It is an another object of the present invention to provide an improved vehicle height control system which is convenient to assemble.

It is a further object of the present invention to provide an improved vehicle height control system having durability.

It is a further object of the present invention to provide an improved vehicle height control system which is adaptable to many kinds of vehicles.

It is a further object of the present invention to provide an improved vehicle height control system which is simple in structure and small in size.

It is a further object of the present invention to provide an improved vehicle height control system which is low in cost.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the vehicle height control system of the invention comprises vehicle height adjusting means including an air chamber, an air compressor connected with the vehicle height adjusting means through an air supply conduit, an air drain conduit connected with the air supply conduit, an air drain valve disposed in the air drain conduit and which is opened so as to discharge to the atmosphere, air stored in the air chamber and the air supply conduit, a cut-off valve disposed in the air supply conduit between the vehicle height adjusting means and the air compressor and which is closed to store air in the air chamber, and a controller for operation so that the air drain valve is maintained opened for a predetermined time when operation of the air compressor is started and the cut-off valve is opened at the same time as or after operation of the air compressor is started.

BRIEF DESCRIPTION OF THE DRAWINGS

The features and advantages of the vehicle height control system according to the present invention will be more clearly appreciated from the following description in conjunction with the accompanying drawings wherein.

DETAILED DESCRIPTION OF THE PREFERRED EMBODIMENT

Figure 1:
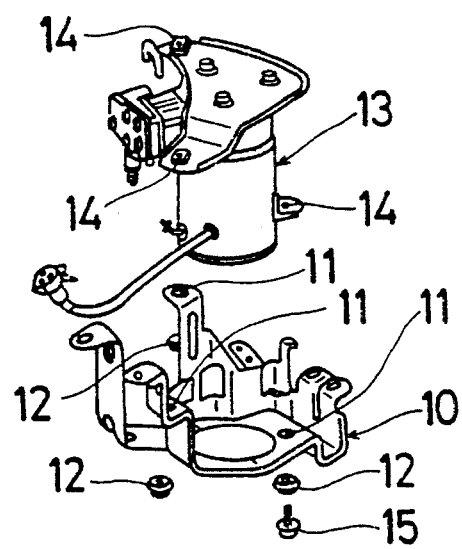
FIG. 1 is a perspective view of an air compressor and a bracket of a vehicle height control system of the present invention and showing the mounting of the air compressor on the bracket.

In FIG. 1, a vehicle height control system is shown to include a bracket 10 for mounting an electric air compressor 13, having radial flanges 14, on a vehicle (not shown). The bracket 10 includes three openings 11, each of which receives a reduced outer circumferential portion of a rubber antivibration damper 12. Each of the three flanges 14 of the air compressor 13 is connected to a rubber antivibration damper 12 by one of three bolts 15 inserted through an internal opening of a rubber antivibration damper 12 so as to mount the air compressor 13 on the bracket 10. The reduced circumferential portion of each rubber antivibration damper 12 is connected to an enlarged circumferential portion to ensure flexibility in the connection of the flanges 14 by the bolts 15. With the construction described, the air compressor 13 is mounted on the bracket 10 through the rubber antivibration dampers 12.

Figure 2:
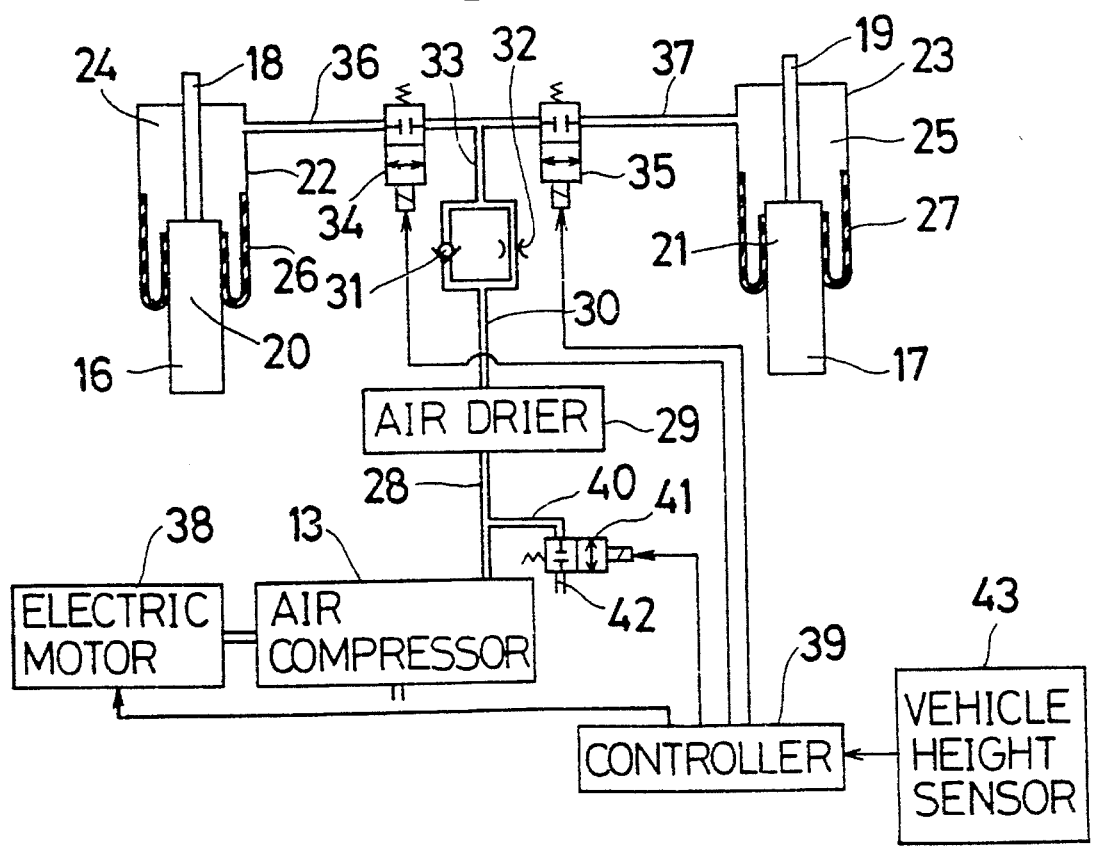
FIG. 2 is a schematic view of a vehicle height control system of the present invention.

In the FIG. 2 the reference numerals 16 and 17 indicate shock absorbers connected with right and left side wheels, respectively. The hock absorbers 16 and 17 include telescopic piston rods 18, 19 and absorber cylinders 20, 21, respectively. Absorber cylinders 20 and 21 are conventionally received in outer cover shells 23 and 24, respectively. Inverted flexible diaphragms 26 and 27 are respectively connected at one end with an inner wall surface of each of the outer cover shells 23 and 24 and further connected at the other end with an outer circumferential portion of the absorber cylinders 20 and 21. Fluid tight, expandable air chambers 24 and 25, each of which is sealed at an inner portion of the outer cover shells 23 and 24, are thus provided. The lengths of the shock absorbers 16 and 17 are varied by the pressure of the air supplied into the air chambers 24 and 25, under pressure, so as to adjust the vehicle height.

The air compressor 13 is connected with the air chambers 24 and 25 through a conduit 28, an air drier 29, a conduit 30, a one-way valve 31, an orifice 32 disposed in parallel to the one-way valve 31, a conduit 33, conduits 36 and 37 and electro magnetic cut-off valves 34 and 35 in the respective conduits 36 and 37 and which are normally closed. The air compressor 13 is driven by an electric motor 38 controlled by a controller 39. The electric motor 38 is supplied with electric power from an electric power source (not shown) when high pressure air needs to be supplied to the air chambers 24 and 25. The one-way valve 31 and the orifice 32 are used to prevent the air pressure in the air drier 29 from increasing when the vehicle height is reduced by venting air from the chambers 24 and 25.

The conduit 28 is connected with a vent port 42 through a conduit 40 and an air drain valve 41. Each of the cut-off valves 34 and 35 and the air drain valve 41 is individually controlled by the controller 39. The controller 39 controls electric power supplied to the electric motor 38 according to vehicle height determined by a vehicle height sensor 43. When the vehicle height, as determined by the vehicle height sensor 43, reaches a target height set by the controller 39, operation of the air compressor 13 is stopped and the cut-off valves 34 and 35 and the air drain valve 41 are closed by the controller 39.

Figure 3:
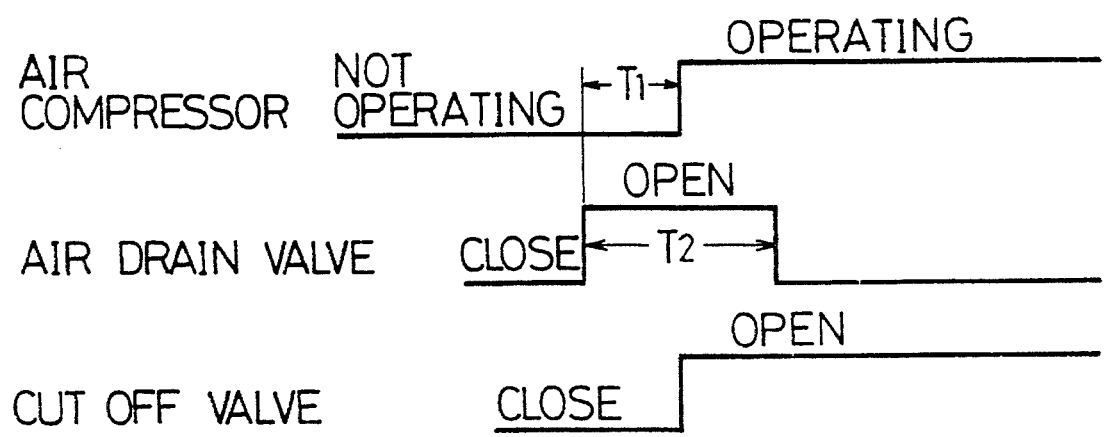
FIG. 3 is a timing chart for a vehicle height control system of the present invention when operation of the air compressor is started.

When the weight load on the vehicle is increased by an increase in the number of passengers, for example, the vehicle height sensor 43 determines that the vehicle height is lower than the target height. Therefore, operation of the air compressor 13 is started with electric power supplied from the electric power source when a predetermined time T1 passes after the air drain valve 41 is opened, as shown in the FIG. 3. Further the air drain valve 41 is closed at a predetermined time T2 after the air drain valve 41 is opened. The cut-off valves 34 and 35 are opened at the moment operation of the air compressor 13 is started as shown in FIG. 3. However, the cut-off valves 34 and 35 may be opened after operation of the air compressor 13 is started. Further, the cut-off valves 34 and 35 may be opened after the air drain valve 41 is closed.

As described above, because the air drain valve 41 remains opened during the time when operation of the air compressor 13 is started, the air pressure in the conduit 28 is extremely low during the time T1 (from the moment when the air drain valve 41 is opened to the moment when operation of the air compressor 13 is started). Therefore, starting resistance to operation of the air compressor 13 and the electric motor 38 as a result of air pressure in the conduit 28 is small. Further, because a part of the air pumped into the conduit 28 by tie air compressor 13 is discharged through the air drain valve 41, the air pressure in the conduit 28 is gradually increased and the load on the electric motor 38 due to air pressure in the conduit 28 from the air compressor 13 is also gradually increased. Therefore, vibration generated at the air compressor 13 is small because the rate of load variation on the electric motor 38 receive is low.

After the air drain valve 41 is closed and the cut-off valves 34, 35 are opened, the air compressor 13 pumps the high pressure air into the air chambers 24, 25 and the vehicle height is increased.

Figure 4:
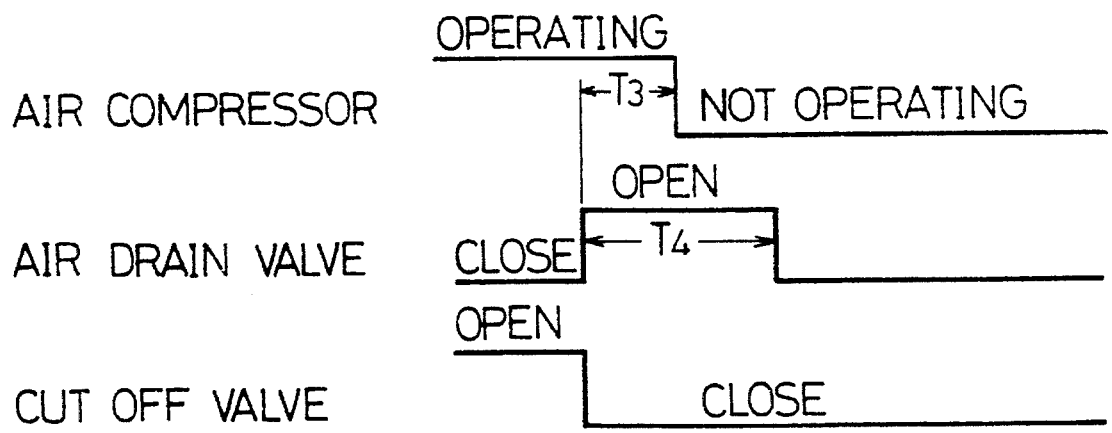
FIG. 4 is a timing chart for a vehicle height control system of the present invention when operation of the air compressor is stopped.

When the vehicle height sensor 43 indicates that the vehicle height reaches the target height, the air drain valve 41 is opened at the moment the cut-off valves 34, 35 are closed. The electric motor 38 is no longer supplied with the electric power and the air compressor 13 is stopped at a predetermined time T3 after the air drain valve 41 is opened, as shown in the FIG. 4. Further the air drain valve 41 is closed at a predetermined time T4 after the air drain valve 41 is opened. The cut-off valves 34 and 35 are closed at the moment the air drain valve 41 is opened as shown in the FIG. 4. However, the cut-off valves 34, 35 may be closed before the air drain valve 41 is opened. Further, the cut-off valves 34, 35 may be closed after the air drain valve 41 is opened and before operation of the air compressor 13 is stopped.

As described above, because the air drain valve 41 remains opened during the time when operation of the air compressor 13 is stopped, air pressure in the conduit 28 is reduced to a low level during passage of the time T3 (from the moment when the air drain valve 41 is opened to the moment when operation of the air compressor 13 is stopped. Therefore, the load on the air compressor 13 and the electric motor 38, as a result of air pressure in the conduit 28, is small when operation of the air compressor 13 is stopped. Therefore, vibration generated at the air compressor 13 is small because the rate of load variation on the electric motor 38 is low.

When the weight load on the vehicle is reduced by a decrease in the number of passengers, for example, the vehicle height sensor 43 determines that vehicle height is higher than the target height. The cut-off valves 34 and 35 are opened and the air drain valve 41 is opened. Therefore, because high pressure air in the air chambers 24 and 25 is discharged to the atmosphere, the air pressure in the air chambers 24 and 25 is reduced and the vehicle height is decreased.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle height control system comprising:
   vehicle height adjusting means including an air chamber;
   an air compressor connected with the vehicle height adjusting means through an air supply conduit;
   an air drain conduit connected with the air supply conduit;
   an air drain valve disposed in the air drain conduit, the air drain valve discharging air stored in the air chamber and the air supply conduit to the atmosphere when opened;
   a cut-off valve disposed between the vehicle height adjusting means and the air compressor in the air supply conduit, the cut-off valve operating to store the air in the air chamber when closed; and
   control means for controlling operation of the air compressor, the air drain valve and the cut-off valve to determine the amount of air stored in the air chamber, to maintain the air drain valve opened for a predetermined time during starting operation of the air compressor and to open the cut-off valve after operation of the air compressor is started.

2. A vehicle height control system comprising:
   vehicle height adjusting means including an air chamber;
   an air compressor connected with the vehicle height adjusting means through an air supply conduit;
   an air drain conduit connected with the air supply conduit;
   an air drain valve disposed in the air drain conduit, the air drain valve discharging air stored in the air chamber and the air supply conduit to the atmosphere when opened;
   a cut-off valve disposed between the vehicle height adjusting means and the air compressor in the air supply conduit, the cut-off valve operating to store the air in the air chamber when closed; and
   control means for controlling operation of the air compressor, the air drain valve and the cut-off valve to determine the amount of air stored in the air chamber, to retain the air drain valve opened for a predetermined time during stopping operation of the air compressor and to close the cut-off valve before operation of the air compressor is stopped.

3. A method of operating a vehicle height control system having vehicle height adjusting means including an air chamber; an air compressor connected with the vehicle height adjusting means through an air supply conduit; an air drain conduit connected with the air supply conduit; an air drain valve in the air drain conduit, the air drain valve discharging air stored in the air chamber and the air supply conduit to the atmosphere when opened; and a cut-off valve between the vehicle height adjusting means and the air compressor in the air supply conduit, the cut-off valve storing air in the air chamber when closed and emitting air from the air compressor to the air chamber when opened; said method comprising the steps of:
   determining vehicle height in relation to a target height;
   opening the air drain valve for a first time period, starting operation of the air compressor during said first time period, and opening the cut-off valve after operation of the air compressor is started when vehicle height is less than the target height; and
   opening the air drain valve for a second time period, stopping operation of the air compressor during said second time period, and closing the cut-off valve after operation of the air compressor is stopped when the vehicle height is more than the target height.

4. The method of operating a vehicle height control system as recited in claim 3 comprising the steps of:
   maintaining the air drain valve and the cut-off valve closed and the compressor inoperative when the vehicle height is equal to the target height.

5. A method of operating a vehicle height control system to increase vehicle height, the system having vehicle height adjusting means including an air chamber; an air compressor connected with the vehicle height adjusting means through an air supply conduit; an air drain conduit connected with the air supply conduit; an air drain valve in the air drain conduit, the air drain valve discharging air stored in the air chamber and the air supply conduit to the atmosphere when opened; a cut-off valve between the vehicle height adjusting means and the air compressor in the air supply conduit, the cut-off valve storing air in the air chamber when closed; said method comprising the steps of:
   opening the air drain valve for a predetermined time;
   starting operation of the air compressor during said predetermined time; and
   opening the cut-off valve after operation of the air compressor is started.

6. A method of operating a vehicle height control system to decrease vehicle height, the system having vehicle height adjusting means including an air chamber; an air compressor connected with the vehicle height adjusting means through an air supply conduit; an air drain conduit connected with the air supply conduit; an air drain valve in the air drain conduit, the air drain valve discharging air stored in the air chamber and the air supply conduit to the atmosphere when opened; a cut-off valve between the vehicle height adjusting means and the air compressor in the air supply conduit, the cut-off valve storing air in the air chamber when closed; said method comprising the steps of:
   opening the air drain valve for a predetermined time;
   stopping operation of the air compressor during said predetermined time; and
   closing the cut-off valve after operation of the air compressor is stopped.

* * * * *